Oct. 13, 1931.　　　A. J. JANALIK　　　1,827,009

WATER DEFLECTOR

Filed July 30, 1929　　2 Sheets-Sheet 1

Inventor
A. J. Janalik

By
W. E. Beck Jr.
Attorney

Oct. 13, 1931.  A. J. JANALIK  1,827,009
WATER DEFLECTOR
Filed July 30, 1929   2 Sheets-Sheet 2
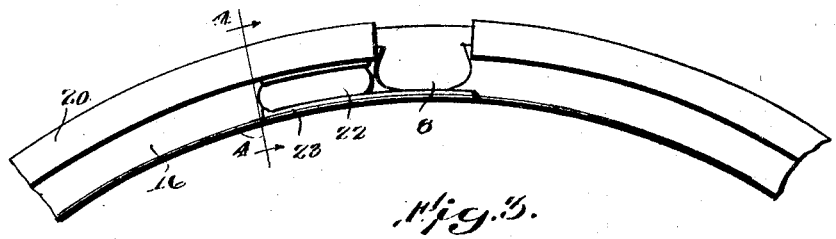
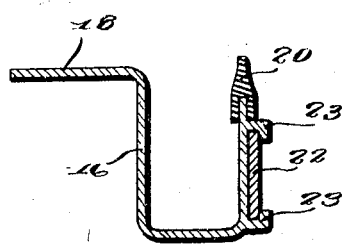
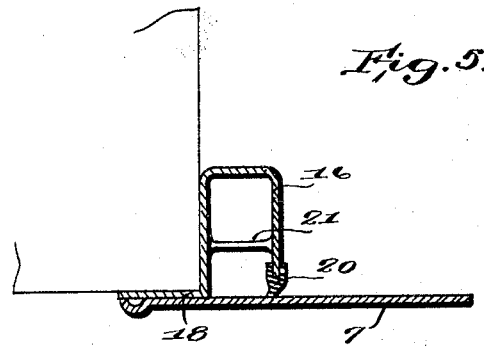
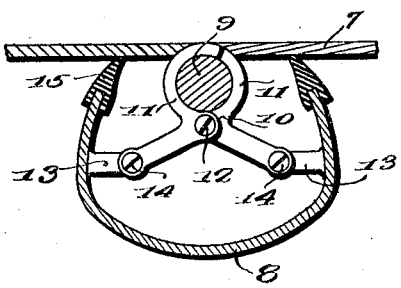
Inventor
A. J. Janalik
By W. E. Beck Jr.
Attorney Patented Oct. 13, 1931

1,827,009

UNITED STATES PATENT OFFICE

ALOIS JOSEPH JANALIK, OF NEW YORK, N. Y.

WATER DEFLECTOR

Application filed July 30, 1929. Serial No. 382,244.

My invention relates to an attachment for motor vehicles adapted to protect the engine of the vehicle from getting wet in stormy weather.

It is an object of the invention to provide troughs beneath the hood of the engine adapted to collect and carry-off the water which seeps beneath the hood, so that the engine will not get wet.

A further object of the invention is to provide a device of the above mentioned character which is simple and durable in construction, reliable and efficient in use and inexpensive to manufacture.

Other objects and advantages of the invention will be apparent during the course of the following description.

Figure 1:
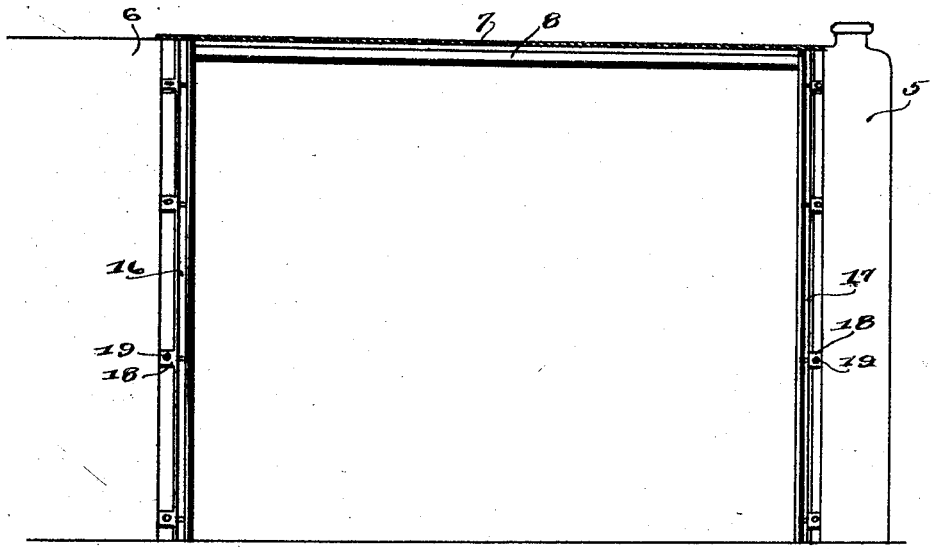
Figure 2:
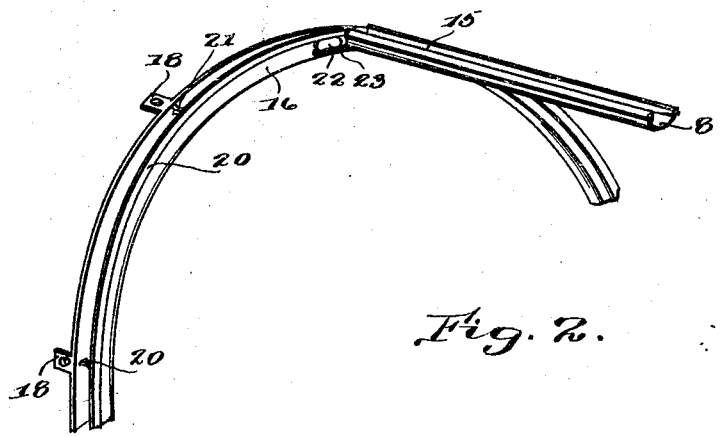

In the accompanying drawings, forming a part of this specification and in which like numerals are employed to designate like parts throughout the same, Fig. 1 is a side elevation of my device attached to a motor vehicle, Fig. 2 is a perspective view of the device, Fig. 3 is a side elevation of one of the end troughs, Fig. 4 is a cross sectional view taken on lines 4—4 of Fig. 3, Fig. 5 is a cross sectional view of the end leader showing its relative position with respect to the engine hood when the latter is closed, and, Fig. 6 is a cross section of the longitudinal leader.

In the drawings, wherein for the purpose of illustration, I have shown a preferred embodiment of my invention, the numeral 5 denotes the radiator of a motor vehicle, 6 the cowl and 7 the hood which covers the engine.

Referring more particularly to my invention a U-shaped metal trough 8 is suspended from the pintle rod 9 of the hood 7, by means of hangers 10. The trough extends longitudinally of the hood and serves as a leader to collect the water which seeps through the hinged joint of the hood sections. The hangers consist of complementary members 11 secured together intermediate their ends by means of the pivot pin 12. The upper ends of the members, are curved in opposite directions and are adapted to engage over the pintle rod 9 of the hood, while the lower ends are bent outwardly and connected with the brackets 13 secured to the inner sides of the trough, by means of the screws 14. Rubber strips 15 extend along the edges of the trough, being engaged by the hood, when the latter is closed, providing a leak-proof joint between the trough and hood.

The ends of the trough 8 communicate with end troughs 16 and 17, which are U-shaped in cross section and are curved longitudinally to conform to the contour of the cowl and radiator, to which they are attached by means of lugs 18 extending laterally from one edge of the troughs and fasteners 19. A rubber strip 20 extends along the outer edge of the end troughs, forming a tight fit between the end troughs and hood, as more clearly shown in Fig. 5. Cross members 21 serve to brace the end troughs, being disposed at spaced intervals throughout the length of the troughs. The water collected in the trough 8 is discharged into the end troughs, which together with the water which seeps in beneath the ends of the hood is carried down the sides of the hood, being discharged from the end troughs onto the ground.

When it is desired to detach the trough 8, the openings through the sides of the end troughs, where the horizontal trough is connected with the end troughs, are closed by covers 22, which are slidably mounted in guides 23 on the outer face of the outer side of the end troughs, as more clearly shown in Fig. 3.

From the foregoing, it will be seen the troughs will collect all the water which seeps beneath the hood of the engine and will carry the water off so as to thoroughly protect the engine from getting wet.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. An attachment for automobiles comprising a trough disposed beneath the hood of the automobile and having brackets therein and a hanger for the trough composed of a pair of complementary clamping members pivotally attached to said brackets and pivotally attached to each other intermediate their ends for cooperatively engaging the pintle rod of the hood.

2. An attachment for automobiles comprising a pair of arcuate troughs disposed beneath the hood of the automobile at opposite ends thereof, a connecting trough for said arcuate troughs, said arcuate troughs having openings in their inner faces for removably receiving the ends of said connecting trough, and a sliding cover for closing said openings when the connecting trough is removed.

3. An attachment for automobiles comprising a pair of arcuate troughs disposed beneath the hood of the automobile at opposite ends thereof, a connecting trough for said arcuate troughs, said arcuate troughs having openings in their inner faces for removably receiving the ends of said connecting trough, and a sliding cover for closing said openings when the connecting trough is removed, said connecting trough having brackets therein and a hanger for the connecting trough composed of a pair of complementary clamping members pivotally attached to said brackets and pivotally attached to each other intermediate their ends for cooperatively engaging the pintle rod of the hood.

In testimony whereof I affix my signature.

ALOIS JOSEPH JANALIK.